United States Patent
Li et al.

(10) Patent No.: US 10,650,830 B2
(45) Date of Patent: May 12, 2020

(54) IDENTITY VECTOR PROCESSING METHOD AND COMPUTER DEVICE

(71) Applicant: TENCENT TECHNOLOGY (SHENZHEN) COMPANY LIMITED, Shenzhen (CN)

(72) Inventors: Wei Li, Shenzhen (CN); Binghua Qian, Shenzhen (CN); Xingming Jin, Shenzhen (CN); Ke Li, Shenzhen (CN); Fuzhang Wu, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 94 days.

(21) Appl. No.: 15/954,416

(22) Filed: Apr. 16, 2018

(65) Prior Publication Data
US 2018/0233151 A1    Aug. 16, 2018

Related U.S. Application Data

(63) Continuation of application No. PCT/CN2017/092530, filed on Jul. 11, 2017.

(30) Foreign Application Priority Data

Jul. 15, 2016 (CN) .......................... 2016 1 0560347

(51) Int. Cl.
*G10L 17/00* (2013.01)
*G10L 17/20* (2013.01)
(Continued)

(52) U.S. Cl.
CPC .............. *G10L 17/20* (2013.01); *G10L 17/08* (2013.01); *G10L 17/02* (2013.01)

(58) Field of Classification Search
CPC ......... G10L 17/00; G10L 17/04; G10L 17/06; G10L 17/14; G10L 17/20
(Continued)

(56) References Cited

U.S. PATENT DOCUMENTS 5,621,861 A * 4/1997 Hayashi ................... G06N 3/08
                                                         706/25
6,499,012 B1 * 12/2002 Peters ..................... G10L 17/04
                                                        704/246
(Continued)

FOREIGN PATENT DOCUMENTS

CN       101650944        2/2010
CN       104167208        11/2014
(Continued)

OTHER PUBLICATIONS

International Search Report dated Sep. 27, 2017 in PCT/CN2017/092530 filed Jul. 11, 2017. (With English Translation).
(Continued)

*Primary Examiner* — Qi Han
(74) *Attorney, Agent, or Firm* — Oblon, McClelland, Maier & Neustadt, L.L.P.

(57) ABSTRACT

Processing circuitry of an information processing apparatus obtains a set of identity vectors that are calculated according to voice samples from speakers. The identity vectors are classified into speaker classes respectively corresponding to the speakers. The processing circuitry selects, from the identity vectors, first subsets of interclass neighboring identity vectors respectively corresponding to the identity vectors and second subsets of intraclass neighboring identity vectors respectively corresponding to the identity vectors. The processing circuitry determines an interclass difference based on the first subsets of interclass neighboring identity vectors and the corresponding identity vectors; and determines an intraclass difference based on the second subsets of
(Continued)

intraclass neighboring identify vectors and the corresponding identity vectors. Further, the processing circuitry determines a set of basis vectors to maximize a projection of the interclass difference on the basis vectors and to minimize a projection of the intraclass difference on the basis vectors.

20 Claims, 8 Drawing Sheets

(51) Int. Cl.
    *G10L 17/08*     (2013.01)
    *G10L 17/02*     (2013.01)

(58) Field of Classification Search
    USPC .................. 704/246, 250, 247, 249, 245
    See application file for complete search history.

(56) References Cited

U.S. PATENT DOCUMENTS

| | | | |
|---|---|---|---|
| 7,231,352 B2 * | 6/2007 | Kustner | ............... G10L 15/02 |
| | | | 704/256 |
| 7,961,956 B1 | 6/2011 | Minter | |
| 2004/0172241 A1 * | 9/2004 | Mahe | ............... G10L 21/0364 |
| | | | 704/205 |
| 2009/0297046 A1 | 12/2009 | Zhao et al. | |
| 2014/0250523 A1 * | 9/2014 | Savvides | ............... G06F 21/32 |
| | | | 726/19 |
| 2015/0117766 A1 * | 4/2015 | Tickoo | ............... G06N 20/00 |
| | | | 382/160 |

FOREIGN PATENT DOCUMENTS

| | | |
|---|---|---|
| CN | 104538035 | 4/2015 |
| CN | 104573714 | 4/2015 |
| CN | 105160303 | 12/2015 |
| CN | 105261367 | 1/2016 |
| CN | 106128466 | 11/2016 |

OTHER PUBLICATIONS

International Preliminary Report dated Jan. 15, 2019 in PCT/CN2017/092530 filed Jul. 11, 2017. (With English Translation).
Written Opinion dated Sep. 22, 2017 in PCT/CN2017/092530 filed Jul. 11, 2017. (With English Translation).
Office Action dated Nov. 6, 2018 in Chinese Patent Application No. 201610560347.0 (With Concise English Translation).
Office Action dated Feb. 3, 2019 in Chinese Patent Application No. 201610560347.0 (With Concise English Translation).

* cited by examiner

IDENTITY VECTOR PROCESSING METHOD AND COMPUTER DEVICE

RELATED APPLICATION

This application is a continuation of International Application No. PCT/CN2017/092530, filed on Jul. 11, 2017, which claims priority to Chinese Patent Application No. 201610560347.0, entitled "IDENTITY VECTOR PROCESSING METHOD AND APPARATUS" filed with the Patent Office of China on Jul. 15, 2016. The entire disclosures of the prior applications are hereby incorporated by reference in their entirety.

FIELD OF THE TECHNOLOGY

This application relates to the field of computer technologies, and in particular, to an identity vector processing method and a computer device.

BACKGROUND OF THE DISCLOSURE

Recognition of a speaker identity is a significant identity recognition means. A user speaks a segment of voice, and a terminal acquires the segment of voice, performs a series of operations, such as preprocessing, feature extracting, modeling, and parameter estimating, on the acquired voice, and then maps the voice into a vector having a determined length and capable of expressing a voice feature of the speaker. The vector is referred to as an identity vector. The identity vector may well express identity information of the speaker in the corresponding voice. The identity vector of the speaker is compared with an identity vector of a target user, and whether the speaker is the target user may be determined according to a degree of similarity between the identity vector of the speaker and the identity vector of the target user, so as to implement speaker identity verification.

However, the identity vector is apt to be interfered with by channel variability and environment variability, and as a result accuracy of identity recognition of the speaker is influenced. The channel variability refers to distortion caused on the voice by difference in acquiring terminals and/or difference in transmission. The difference in acquiring terminals is, for example, difference in terminal types such as a mobile phone and a tablet computer, and the difference in transmission is, for example, difference in transmission channels such as using wired transmission or wireless transmission. The environment variability refers to distortion caused on the voice by a factor of environment where the speaker is. The factor of environment is, for example, indoor or outdoor, or environmental noises.

SUMMARY

Embodiments of this application provide an identity vector processing method and a computer device.

A method for identity processing is described. Processing circuitry of an information processing apparatus obtains a set of identity vectors that are calculated according to voice samples from speakers. The identity vectors are classified into speaker classes respectively corresponding to the speakers. The processing circuitry selects, from the identity vectors, first subsets of interclass neighboring identity vectors respectively corresponding to the identity vectors. A first subset of the first subsets of interclass neighboring identity vectors corresponding to an identity vector of the identity vectors are in different speaker classes from the corresponding identify vector. The processing circuitry selects, from the identity vectors, second subsets of intraclass neighboring identity vectors respectively corresponding to the identity vectors. A second subset of the second subsets of intraclass neighboring identity vectors corresponding to an identity vector of the identity vectors are in a same speaker class as the corresponding identity vector. The processing circuitry determines an interclass difference based on the first subsets of interclass neighboring identity vectors and the corresponding identity vectors; and determines an intraclass difference based on the second subsets of intraclass neighboring identify vectors and the corresponding identity vectors. Further, the processing circuitry determines a set of basis vectors to maximize a projection of the interclass difference on the basis vectors and to minimize a projection of the intraclass difference on the basis vectors.

To select, from the identity vectors, the first subsets of interclass neighboring identity vectors respectively corresponding to the identity vectors, in some embodiments, the processing circuitry calculates, for a specific identity vector of the identity vectors, distances between the specific identity vector and other identity vectors that are in different speaker classes from the specific identity vector. Then, the processing circuitry ranks the other identity vectors according to an ascending order of the distances and selects, according to the ranking of the other identity vectors, a preset number of the other identity vectors as a first subset of the first subsets of interclass neighboring identity vectors corresponding to the specific identity vector.

To select, from the identity vectors, the second subsets of intraclass neighboring identity vectors respectively corresponding to the identity vectors, in some embodiments, the processing circuitry calculates, for a specific identity vector of the identity vectors, distances between the specific identity vector and other identity vectors that are in the same speaker class as the specific identity vector and ranks the other identity vectors according to an ascending order of the distances. Then, the processing circuitry selects, according to the ranking of the other identity vectors, a preset number of the other identity vectors as a second subset of the second subsets of interclass neighboring identity vectors corresponding to the specific identity vector.

In some embodiments, to determine the interclass difference based on the first subsets of interclass neighboring identity vectors and the corresponding identity vectors, the processing circuitry calculates, based on a specific first subset of the first subsets of interclass neighboring identity vectors corresponding to a specific identity vector of a first speaker class, averages respectively for speaker classes other than the first speaker class. Then, the processing circuitry weights covariances of the specific identity vector and the averages in a calculation to obtain the interclass difference.

In an example, the processing circuitry selects, from the specific first subset of the first subsets of interclass neighboring identity vectors corresponding to the specific identity vector of the first speaker class, a group of interclass neighboring identity vectors of a second speaker class. Then, the processing circuitry determines a first distance of the specific identity vector to the group of interclass neighboring identity vectors, and determine a second distance of the specific identity vector to the second subset of intraclass neighboring identify vectors corresponding to the specific identity vector. Then, the processing circuitry extracts a minimum distance of the first distance and the second distance, and calculates a sum of the first distance and the second distance. Further, the processing circuitry divides the minimum distance by the sum, to obtain a weight for weighting specific covariances of the specific identity vector and the interclass neighboring identity vectors of the second speaker class.

In an embodiment, before the extraction of the minimum distance, the processing circuitry separately performs synchronous scaling on the first distance and the second distance according to an adjustable parameter.

According to an aspect of the disclosure, to determine the intraclass difference based on the second subsets of intraclass neighboring identify vectors and the corresponding identity vectors, the processing circuitry calculates averages respectively based on the second subsets of interclass neighboring identity vectors corresponding to the identity vectors, and calculates covariances respectively of the identity vectors and the corresponding averages. Then, the processing circuitry weights the covariances in a calculation to obtain the intraclass difference.

In an embodiment, the processing circuitry receives an input identity vector of a voice sample for a verification to verify the voice sample being generated by a target speaker. Then, the processing circuitry converts the identity vectors corresponding to the target speaker according to the basis vectors and converts the input identity vector according to the basis vectors. Further, the processing circuitry calculates a degree of similarity between the converted identity vectors and the converted input identity vector and verifies whether the voice sample belongs to the target speaker according to the degree of similarity.

In an embodiment, the processing circuitry calculates the interclass difference using the following formula:

$$\tilde{S}_b = \sum_{i=1}^{C} \sum_{\substack{j=1 \\ j \neq i}}^{C} \sum_{l=1}^{N_i} \omega_l^{ij}(x_l^i - M_l^{ij})(x_l^i - M_l^{ij})^t$$

wherein $\tilde{S}_b$ is the interclass difference; C represents a total number of the speaker classes in the set; i and j are serial numbers of different speaker classes in the set; l is a serial number of an identity vector of an $i^{th}$ speaker class; $N_j$ represents a total number of identity vectors of the $i^{th}$ speaker class; t represents transposition; $M_l^{ij}$ represents a first sample average of interclass neighboring identity vectors $NN_K(x_l^i, j)$ of a $j^{th}$ speaker class corresponding to an identity vector $x_l^i$; and $\omega_l^{ij}$ represents a weight for weighted sum of first covariances of the $j^{th}$ speaker class corresponding to the identity vector $x_l^i$.

In another embodiment, the processing circuitry calculates the intraclass difference using the following formula:

$$\tilde{S}_w = \sum_{i=1}^{C} \sum_{l=1}^{N_i}(x_l^i - M_l^{ii})(x_l^i - M_l^{ii})^t,$$

wherein $\tilde{S}_w$ is the intraclass difference; C represents the total number of speaker classes in the set; i is a serial number of a speaker class in the set; l is a serial number of an identity vector of an $i^{th}$ speaker class; $N_i$ represents a total number of identity vectors of the $i^{th}$ speaker class; t represents transposition; and $M_l^{ii}$ represents a second sample average of intraclass neighboring identity vector $NN_k(x_l^i, i)$ of an identity vector $x_l^i$.

In an example, to determine the set of basis vectors, the processing circuitry looks up for orthogonal basis vectors that enable an objective function $J(v_i)$ to be maximized. In the object function $$J(v_i) = \frac{v_i^t * \tilde{S}_b * v_i}{v_i^t * \tilde{S}_w * v_i},$$

$v_i$ is an $i^{th}$ orthogonal basis vector; t represents transposition; $\tilde{S}_b$ is the interclass difference; and $\tilde{S}_w$ is the intraclass difference.

Aspects of the disclosure provide a computer device that includes processing circuitry. The processing circuitry is configured to obtain, a set of identity vectors that are calculated according to voice samples from speakers. The identity vectors are classified into speaker classes respectively corresponding to the speakers. The processing circuitry selects, from the identity vectors, first subsets of interclass neighboring identity vectors respectively corresponding to the identity vectors. A first subset of interclass neighboring identity vector corresponding to an identity vector are in different speaker classes from the corresponding identify vector. Further, the processing circuitry selects, from the identity vectors, second subsets of intraclass neighboring identity vectors respectively corresponding to the identity vectors. A second subset of intraclass neighboring identity vectors corresponding to an identity vector are in a same speaker class as the corresponding identity vector. The processing circuitry determines an interclass difference based on the first subsets of interclass neighboring identity vectors and the corresponding identity vectors and determine an intraclass difference based on the second subsets of intraclass neighboring identify vectors and the corresponding identity vectors. Further, the processing circuitry determines a set of basis vectors to maximize a projection of the interclass difference on the basis vectors and to minimize a projection of the intraclass difference on the basis vectors.

Aspects of the disclosure also provide a non-transitory computer-readable medium storing instructions which when executed by a processor cause the processor to perform the method for identity processing,

BRIEF DESCRIPTION OF THE DRAWINGS

To describe the technical solutions in the embodiments of this application more clearly, the following briefly describes the accompanying drawings required for the embodiments. The accompanying drawings in the following description show merely some embodiments of this application, and a person of ordinary skill in the art may still derive other drawings from these accompanying drawings.

DESCRIPTION OF EMBODIMENTS

To make the technical solutions and advantages of this application clearer and more comprehensible, the following further describes this application in detail with reference to the accompanying drawings and embodiments. It is understood that the specific embodiments described herein are merely used to explain this application but are not intended to limit this application.

It is understood that the terms such as "first" and "second" used in this application can be used for described all elements in this text, but the elements are not limited to the terms. The terms are merely used for distinguishing a first element from another element. For example, without departing from the scope of this application, a first covariance may be referred to as a second covariance, and similarly, a second covariance may be referred to as a first covariance. The first covariance and the second covariance are both covariances, but are not the same covariance.

Figure 1:
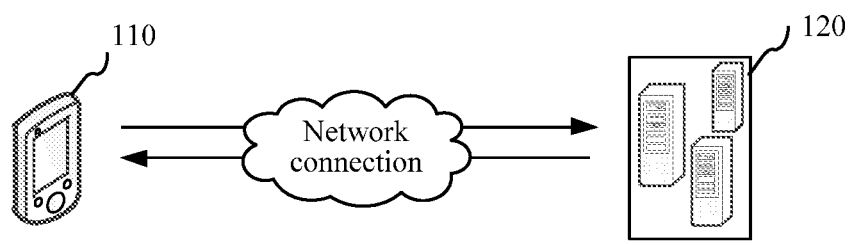
FIG. 1 is a diagram of an application environment of a speaker identity recognition system according to an embodiment.

FIG. 1 is a diagram of an application environment of a speaker identity recognition system according to an embodiment. As shown in FIG. 1, the system includes a terminal 110 and a server 120 that are connected through network connection. The terminal 110 may be configured to acquire a voice, extract an identity vector (i-vector) from the acquired voice, send the identity vector to the server 120, and receive an identity recognition result fed back by the server 120. The server 120 may be configured to separately perform feature transformation on a given identity vector and an identity vector to be verified of a target speaker class according to a base vector set; calculate a degree of similarity between the given identity vector after feature transformation and the identity vector to be verified after feature transformation; perform speaker identity verification according to the degree of similarity; and determine an identity recognition result according to the corresponding target speaker class when the verification succeeds.

The server may be configured to obtain a sample set, the sample set including samples of identity vectors of multiple speaker classes; obtain a corresponding interclass neighboring sample for each sample in the sample set; obtain a corresponding intraclass neighboring sample for each sample in the sample set; determine an interclass difference quantity on the basis of the samples and the corresponding interclass neighboring samples in the sample set; determine an intraclass difference quantity on the basis of the samples and the corresponding intraclass neighboring samples in the sample set; and obtain a base vector set, the interclass difference quantity projected on base vectors in the base vector set being maximized in value, and the intraclass difference quantity projected on the base vectors in the base vector set being minimized in value.

Figure 2A:
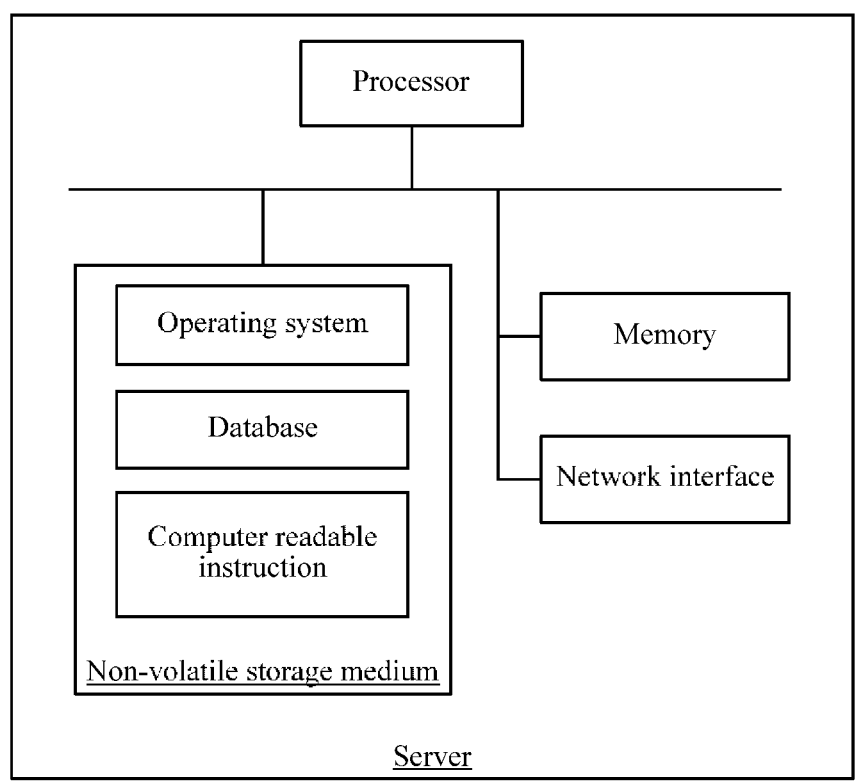
FIG. 2A is a schematic diagram of the internal structure of a server according to an embodiment.

FIG. 2A is a schematic diagram of the internal structure of a server according to an embodiment. As shown in FIG. 2A, the server includes a processor, a non-volatile storage medium, a memory, and a network interface that are connected by using a system bus. The non-volatile storage medium of the server stores an operating system, a database, and a computer readable instruction. The database may store a sample set. The computer readable instruction, when executed by the processor, may cause the processor to implement an identity vector processing method. The processor of the computer device is configured to provide a calculating and control capability, and supports running of the entire computer device. The memory of the memory of the computer device may store computer readable instructions. The computer readable instructions, when executed by the processor, may cause the processor to implement an identity vector processing method. The network interface of the server is configured to be connected and communicate with the terminal. The server may be an independent server or implemented by using a server cluster including multiple servers. A person skilled in the art may understand that, FIG. 2A shows a block diagram of a partial structure related to a solution in this application, and does not constitute a limit to the server to which the solution in this application is applied. Specifically, the server may include more components or fewer components than those shown in the figure, or some components may be combined, or a different component deployment may be used.

Figure 2B:
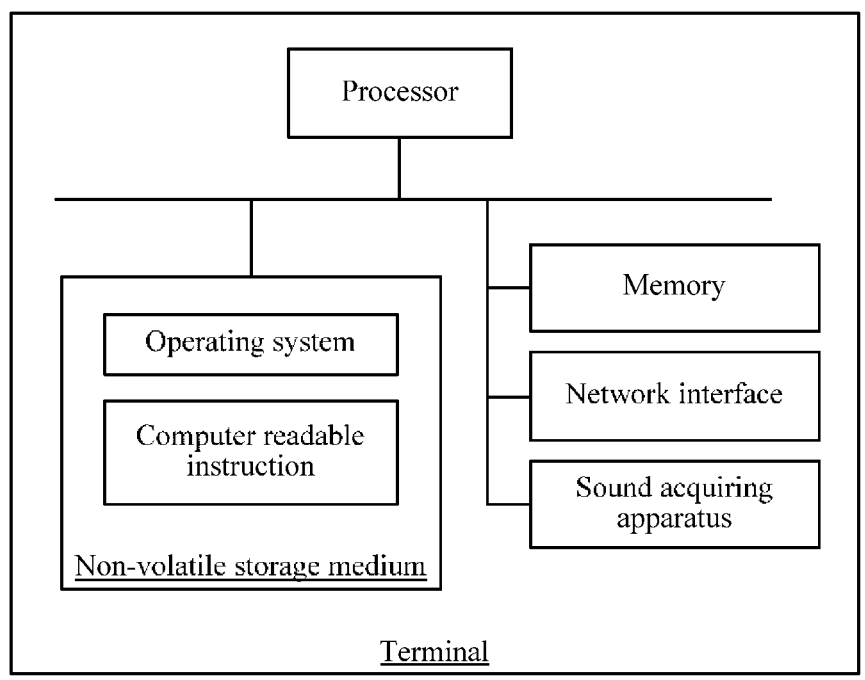
FIG. 2B is a schematic diagram of the internal structure of a terminal according to an embodiment.

FIG. 2B is a schematic diagram of the internal structure of a terminal according to an embodiment. As shown in FIG. 2B, the terminal includes a processor, a non-volatile storage medium, a memory, a network interface, and a sound acquiring apparatus that are connected by using a system bus. The non-volatile storage medium of the terminal stores an operating system, and further stores a computer readable instruction. The computer readable instruction, when executed by the processor, may cause the processor to implement a speaker identity recognition method. The processor is configured to provide computing and control capabilities to support running of the entire terminal. The memory of the terminal may store a computer readable instruction. The computer readable instruction, when executed by the processor, may cause the processor to implement a speaker identity recognition method. The network interface is configured to perform network communication with a server. The terminal may be a mobile phone, a tablet computer, a personal digital assistant, a wearable device, or the like. A person skilled in the art may understand that, FIG. 2B shows a block diagram of a partial structure related to a solution in this application, and does not constitute a limit to the terminal to which the solution in this application is applied. Specifically, the terminal may include more components or fewer components than those shown in the figure, or some components may be combined, or a different component deployment may be used.

Figure 3:
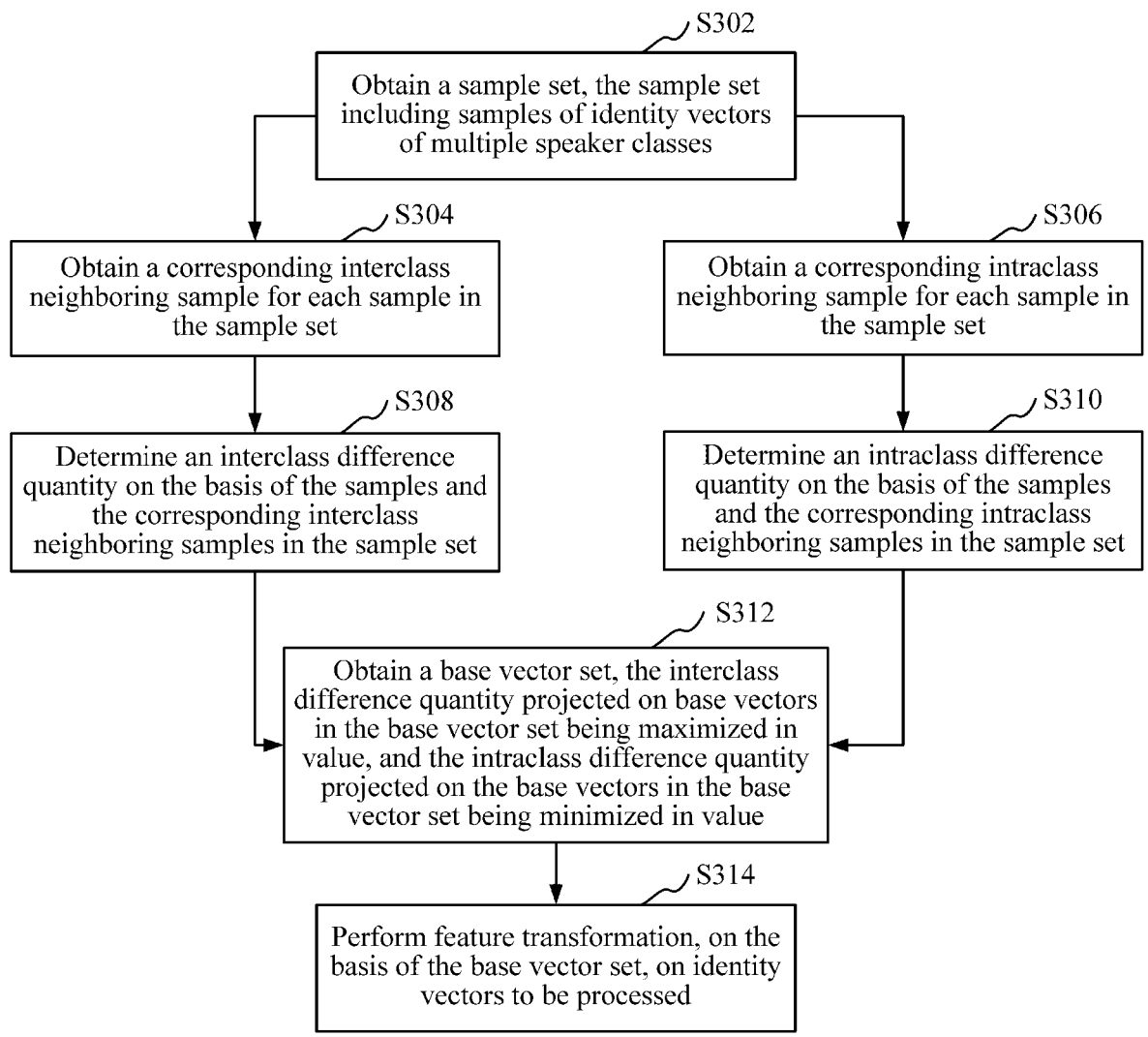
FIG. 3 is a schematic flowchart of an identity vector processing method according to an embodiment.

FIG. 3 is a schematic flowchart of an identity vector processing method according to an embodiment. Descriptions are provided by an example in which the method is applied to a server in this embodiment, and the method may also be applied to a terminal. The method specifically includes the following steps:

S302: Obtain a sample set, the sample set including samples of identity vectors of multiple speaker classes.

Specifically, the sample set comprises several samples. Each sample includes one identity vector, and one speaker class to which the included identity vector belongs is marked for each sample. Moreover, there is a designated quantity of speaker classes in the sample set, and each speaker class may include multiple samples. One speaker class indicates one speaker, samples of the same speaker class are extracted from voices of the same speaker, and samples of different speaker classes are respectively extracted from voices of different speakers. There are multiple samples for any speaker class in the sample set. The identity vector is a vector that is mapped after a series of operations such as preprocessing, feature extracting, modeling, and parameter estimating, has a fixed length, and may be used for distinguishing a speaker identity. The sample set may be stored in a file, a database, or a cache and obtained from the file, the database, or the cache when needed.

S304: Obtain a corresponding interclass neighboring sample for each sample in the sample set.

The interclass neighboring sample corresponding to each sample refers to a neighboring sample in a non-same speaker class of the sample, and the non-same speaker class of the sample refers to a speaker class different from the one to which the sample belongs. The neighboring sample of each sample refers to another sample, in the sample set, having a distance with the sample satisfying a distance proximity condition. Further, the distance approaching condition refers to a condition that is satisfied when proximity between each sample in the sample set and another sample in the sample set is determined. A sample satisfying the distance proximity condition may be a sample having a distance less than a preset distance threshold, or may also be a preset number of samples ranking first after performing ranking according to an ascending order of the distances.

S306: Obtain a corresponding intraclass neighboring sample for each sample in the sample set.

The intraclass neighboring sample corresponding to each sample refers to a neighboring sample in a same speaker class of the sample, and the same speaker class of the sample refers to a speaker class the same as the one to which the sample belongs. The neighboring sample of each sample refers to another sample, in the sample set, having a distance with the sample satisfying a distance proximity condition. The sequence of S304 and S306 can be changed, or S304 and S306 may be performed simultaneously, and S306 may also be performed after S308.

S308: Determine an interclass difference quantity on the basis of the samples and the corresponding interclass neighboring samples in the sample set.

The interclass difference quantity refers to a measurement quantity reflecting a difference between samples of different speaker classes in the sample set. In an embodiment, the server may traverse each sample in the sample set, the traversed samples being corresponding to multiple interclass neighboring samples in the non-same speaker class, calculate a difference between the sample and the corresponding interclass neighboring sample, so as to obtain the interclass difference quantity of the sample set in combination with the differences between all the samples and the corresponding interclass neighboring samples in the sample set.

In an embodiment, the server may also traverse each sample in the sample set, the traversed samples being corresponding to multiple interclass neighboring samples in the non-same speaker class, separately calculate a center based on the corresponding interclass neighboring samples according to the belonged speaker class, and further calculate a difference between the traversed sample and the center of each non-same speaker class, so as to obtain the interclass difference quantity of the sample set in combination with the differences between all the samples and the corresponding centers of the non-same speaker classes in the sample set. The center may be an average or a weighted average.

S310: Determine an intraclass difference quantity on the basis of the samples and the corresponding intraclass neighboring samples in the sample set.

The intraclass difference quantity refers to a measurement quantity reflecting a difference between samples of a same speaker class in the sample set. In an embodiment, the server may traverse each sample in the sample set, the traversed sample being corresponding to an intraclass neighboring sample apart from the traversed sample in the same speaker class, calculate a difference between the sample and the corresponding intraclass neighboring sample, so as to obtain the intraclass difference quantity of the sample set in combination with the differences between all the samples and the corresponding intraclass neighboring samples in the sample set.

In an embodiment, the server may also traverse each sample in the sample set, the traversed sample being corresponding to an intraclass neighboring sample apart from the traversed sample in the same speaker class, calculate a center corresponding to all the intraclass neighboring samples, and calculate a difference between the traversed sample and the center, to further obtain the intraclass difference quantity of the sample set in combination with the calculated differences. The center may be an average or a weighted average.

S312: Obtain a base vector set, the interclass difference quantity projected on base vectors in the base vector set being maximized in value, and the intraclass difference quantity projected on the base vectors in the base vector set being minimized in value.

The base vector set includes multiple base vectors with an equal length. The base vectors in the base vector set may be orthogonal to each other, to facilitate matrix operations. A quantity of the base vectors in the base vector set may be less than a total number of speaker classes in the sample set. The server may look up for a series of base vectors, so that the interclass difference quantity projected on base vectors is maximized in value, and the intraclass difference quantity projected on the base vectors is minimized in value, and form the found base vectors into a base vector set.

S314: Perform feature transformation, on the basis of the base vector set, on identity vectors to be processed.

The feature transformation refers to a processing process of transforming a feature from an original feature space to a new feature space to as to increase the feature distinction. The identity vector is a feature of voices. The identity vector to be processed refers to an identity vector on which feature transformation needs to be performed, and may be an identity vector to be verified, a sample in the sample set, or other identity vectors. Feature transformation is performed, on the basis of the base vector set, on the identity vector to be processed, so that the identity vector after the feature transformation is projected to a multi-dimensional space constructed by the base vector set, thereby forming an identity vector having strong interclass distinction and strong intraclass aggregation. A quantity of the base vectors in the base vector set may be less than a total number of speaker classes in the sample set. After performing feature transformation on the identity vector to be processed, an identity vector with a reduced dimension can be obtained.

By the identity vector processing method, the interclass neighboring samples may reflect a partial distribution of neighboring samples of different speaker classes in the sample set, and the intraclass neighboring samples may reflect a partial distribution of neighboring samples of the same speaker class in the sample set, so that the interclass and intraclass differences in the sample set can be reflected more accurately. The interclass difference quantity determined according to the samples and the corresponding interclass neighboring samples in the sample set can accurately reflect the difference between different speaker classes in the sample set, and the intraclass difference quantity determined according to the samples and the corresponding intraclass neighboring samples in the sample set can accurately reflect the difference between the same speaker class in the sample set. After performing feature transformation, on the basis of the base vector set, on the identity vector to be processed, the identity vector after the feature transformation has a good interclass distinction and intraclass aggregation, the situation in which identity vector recognition performance is lowered caused by interference can be reduced, and the accuracy of speaker identity recognition can be improved.

Figure 4:
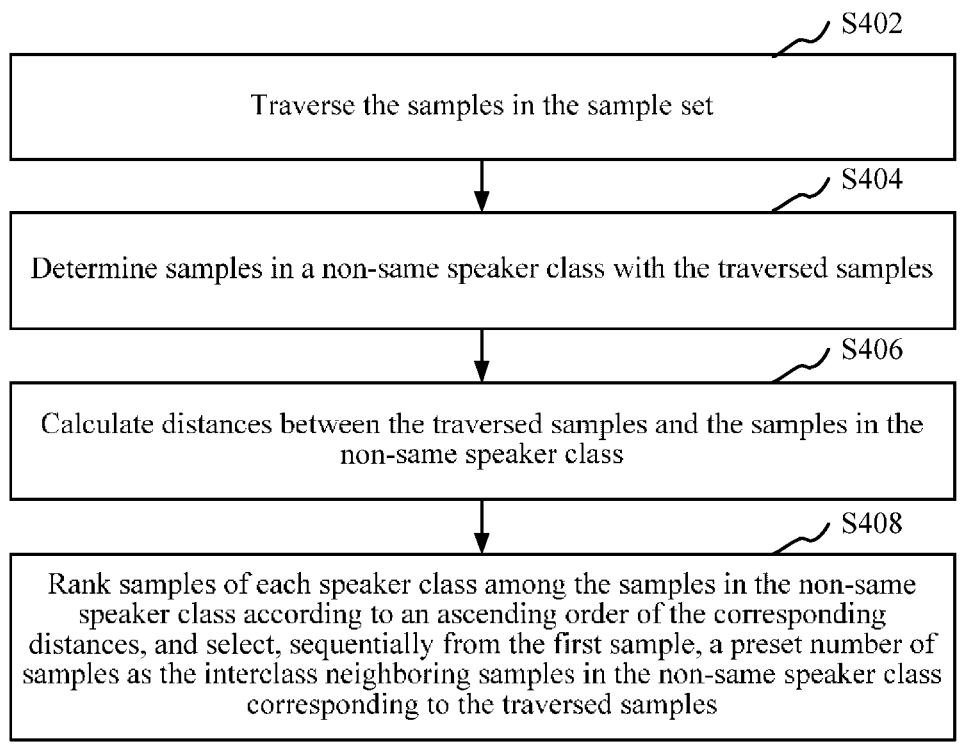
FIG. 4 is a schematic flowchart of steps of obtaining a corresponding interclass neighboring sample for each sample in the sample set according to an embodiment.

FIG. 4 is a schematic flowchart of step S304, that is, obtaining a corresponding interclass neighboring sample for each sample in the sample set according to an embodiment. As shown in FIG. 4, S304 specifically includes the following steps:

S402: Traverse the samples in the sample set.

Specifically, the server may traverse the samples in the sample set according to any sequence, so as to respectively obtain corresponding interclass neighboring samples for the traversed samples.

More specifically, it is assumed that a sample in the sample set is indicated as $x_l^i$, where i is a serial number of a speaker class, l is a serial number of a sample in an $i^{th}$ speaker class, a total number of speaker classes in the sample set is C, a total number of samples in the $i^{th}$ speaker class in the sample set is Ni, and the server traverses the sample set constructed from $x_1^1$ to $x_{Ni}^C$. $x_l^i$ may be a vector with a size of p×l.

S404: Determine samples in a non-same speaker class with the traversed samples.

Specifically, for the traversed sample $x_l^i$, the serial number of the speaker class is i, the serial number of the non-same speaker class is j, and i≠j. The samples with the serial number of the speaker class being j are samples in the non-same speaker class of the traversed sample $x_l^i$.

S406: Calculate distances between the traversed samples and the samples in the non-same speaker class.

Specifically, for the traversed sample $x_l^i$, distances between all the samples in the $j^{th}$ speaker class and the traversed sample $x_l^i$ may be calculated. The distance may adopt a distance used for measuring similarity between samples, such as an Euclidean distance, a Manhatton distance, or a Mahalanobis distance.

S408: Rank samples of each speaker class among the samples in the non-same speaker class according to an ascending order of the corresponding distances, and select, sequentially from the first sample, a preset number of samples as the interclass neighboring samples in the non-same speaker class corresponding to the traversed samples.

Specifically, the samples in the non-same speaker class are samples not in the $i^{th}$ speaker class in the sample set. The each speaker class is the $j^{th}$ speaker class. After ranking all the samples in the $j^{th}$ speaker class according to an ascending order of the distances with the traversed sample $x_l^i$, K samples are selected, from the first one of the ranked samples, to construct interclass neighboring samples $NN_K$ ($x_l^i$,j), where K is a preset number.

In this embodiment, the interclass neighboring sample corresponding to each sample in the sample set can be precisely determined, so as to facilitate precise calculation of the base vector set, thereby improving the recognition performance after performing feature transformation, on the basis of the base vector set, on the identity vector to be processed.

Figure 5:
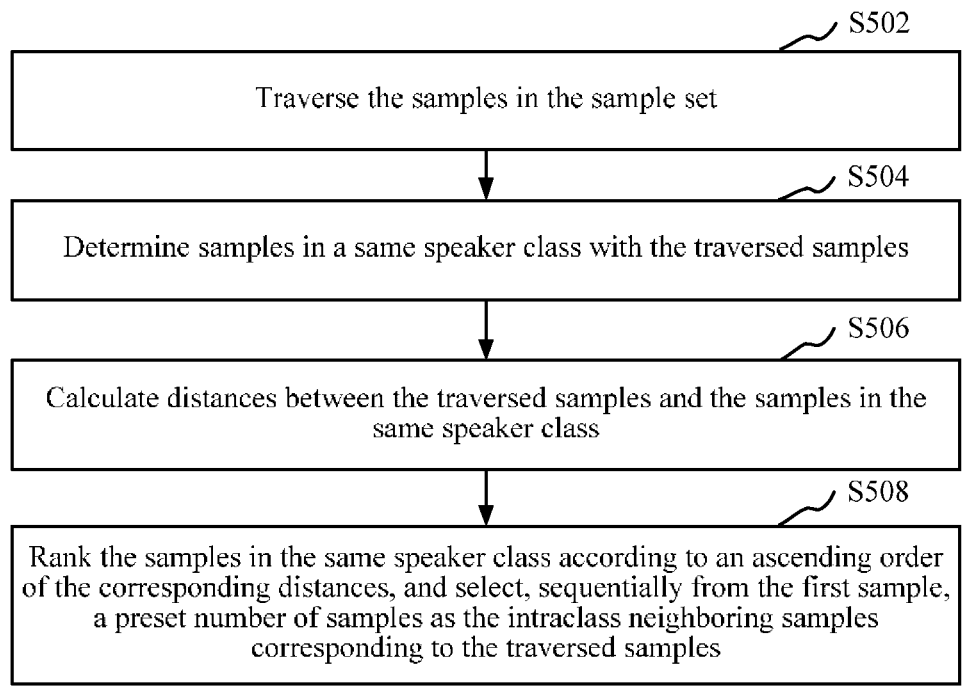
FIG. 5 is a schematic flowchart of steps of obtaining a corresponding intraclass neighboring sample for each sample in the sample set according to an embodiment.

FIG. 5 is a schematic flowchart of step S306, that is, obtaining a corresponding intraclass neighboring sample for each sample in the sample set according to an embodiment. As shown in FIG. 5, step S306 specifically includes the following steps:

S502: Traverse the samples in the sample set.

Specifically, it is assumed that a sample in the sample set is indicated as $x_l^i$, where i is a serial number of a speaker class, l is a serial number of a sample in an $i^{th}$ speaker class, a total number of speaker classes in the sample set is C, a total number of samples in the $i^{th}$ speaker class in the sample set is Ni, and the server traverse the sample set constructed from to $x_1^1$ to $x_{Ni}^C$.

S504: Determine samples in a same speaker class with the traversed samples.

Specifically, for the traversed sample $x_l^i$, the serial number of the speaker class to which the traversed sample $x_l^i$ belongs is i, and a sample apart from the $x_l^i$ and with the serial number of the speaker class being i is a sample in the same speaker class with the traversed sample $x_l^i$.

S506: Calculate distances between the traversed samples and the samples in the same speaker class.

Specifically, for the traversed sample $x_l^i$, distances between all the samples in the $i^{th}$ speaker class apart from $x_l^i$ and the traversed sample $x_l^i$ may be calculated. The distance may adopt a distance used for measuring similarity between samples, such as an Euclidean distance, a Manhatton distance, or a Mahalanobis distance.

S508: Rank the samples in the same speaker class according to an ascending order of the corresponding distances, and select, sequentially from the first sample, a preset number of samples as the intraclass neighboring samples corresponding to the traversed samples.

Specifically, after ranking all the samples in the $i^{th}$ speaker class apart from the traversed sample $x_l^i$ according to an ascending order of the distances with the traversed sample $x_l^i$, K samples are selected, from the first one of the ranked samples, to construct intraclass neighboring samples $NN_K$ ($x_l^i$, i), where K is a preset number.

In this embodiment, the intraclass neighboring sample corresponding to each sample in the sample set can be precisely determined, so as to facilitate precise calculation of the base vector set, thereby improving the recognition performance after performing feature transformation, on the basis of the base vector set, on the identity vector to be processed.

Figure 6:
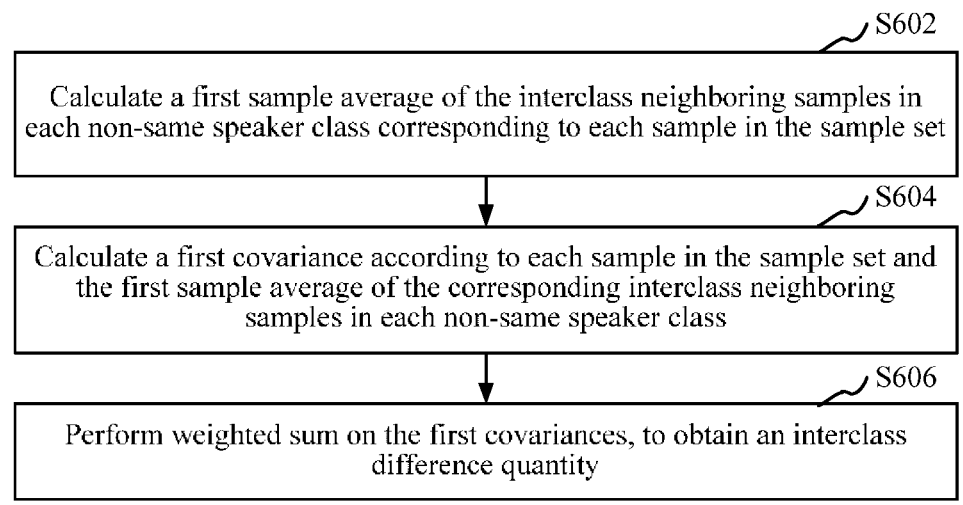
FIG. 6 is a schematic flowchart of steps of determining an interclass difference quantity on the basis of the samples and the corresponding interclass neighboring samples in the sample set according to an embodiment.

FIG. 6 is a schematic flowchart of step S308, that is, determining an interclass difference quantity on the basis of the samples and the corresponding interclass neighboring samples in the sample set according to an embodiment. As shown in FIG. 6 step S308 specifically includes the following steps:

S602: Calculate a first sample average of the interclass neighboring samples in each non-same speaker class corresponding to each sample in the sample set.

Specifically, the first sample average may be calculated according to the following formula (1):

$$M_l^{ij} = \frac{i}{K}\sum_{k=1}^{K} NN_K(x_l^i, j).\quad\text{formula (1)}$$

$M_l^{ij}$ is the first sample average of the interclass neighboring samples $NN_K(x_l^i,j)$ in the $j^{th}$ speaker class of the sample $x_l^i$.

S604: Calculate a first covariance according to each sample in the sample set and the first sample average of the corresponding interclass neighboring samples in each non-same speaker class.

Specifically, the first covariance may be calculated according to the following formula (2):

$$(x_l^i - M_l^{ij})(x_l^i - M_l^{ij})^t\quad\text{formula (2).}$$

Herein, t represents transposition; $x_l^i$ represents an $l^{th}$ sample in the $i^{th}$ speaker class in the sample set; and $M_l^{ij}$ represents the first sample average of the interclass neighboring samples $NN_K(x_l^i,j)$ in the $j^{th}$ speaker class of the sample $x_l^i$.

In the formula (2), a difference between each sample $x_l^i$ and the first sample average $M_l^{ij}$ of the interclass neighboring samples $NN_K(x_l^i,j)$ in the $j^{th}$ speaker class in the set is obtained, and then is multiplied by a transposition of the difference, to obtain the first covariance.

S606: Perform weighted sum on the first covariances, to obtain an interclass difference quantity.

Specifically, the interclass difference quantity may be calculated by using the following formula (3):

$$\tilde{S}_b = \sum_{i=1}^{C}\sum_{\substack{j=1\\j\neq i}}^{C}\sum_{l=1}^{N_i} \omega_l^{ij}(x_l^i - M_l^{ij})(x_l^i - M_l^{ij})^t.\quad\text{formula (3)}$$

$\tilde{S}_b$ is the interclass difference quantity, and specifically is an interclass variance in the formula (3); C represents a total number of speaker classes in the sample set; i and j are serial numbers of different speaker classes in the sample set; 1 is a serial number of a sample of an $i^{th}$ speaker class; $N_i$ represents a total number of samples of the $i^{th}$ speaker class; t represents transposition; $M_l^{ij}$ represents a first sample average of interclass neighboring samples $NN_K(x_l^i,j)x_l^i$ of a $j^{th}$ speaker class corresponding to a sample $x_l^i$; and $\omega_l^{ij}$ represents a weight for weighted sum of first covariances of the $j^{th}$ speaker class corresponding to the sample $x_l^i$.

In this embodiment, the first covariance is calculated based on each sample and the corresponding first sample average in the sample set, and weighted sum is performed on the first covariances, to obtain an interclass difference quantity. The interclass difference quantity can measure the differences between the samples of different speaker classes in the sample set more accurately, so as to facilitate precise calculation of the base vector set, thereby improving the recognition performance after performing feature transformation, on the basis of the base vector set, on the identity vector to be processed.

Figure 7:
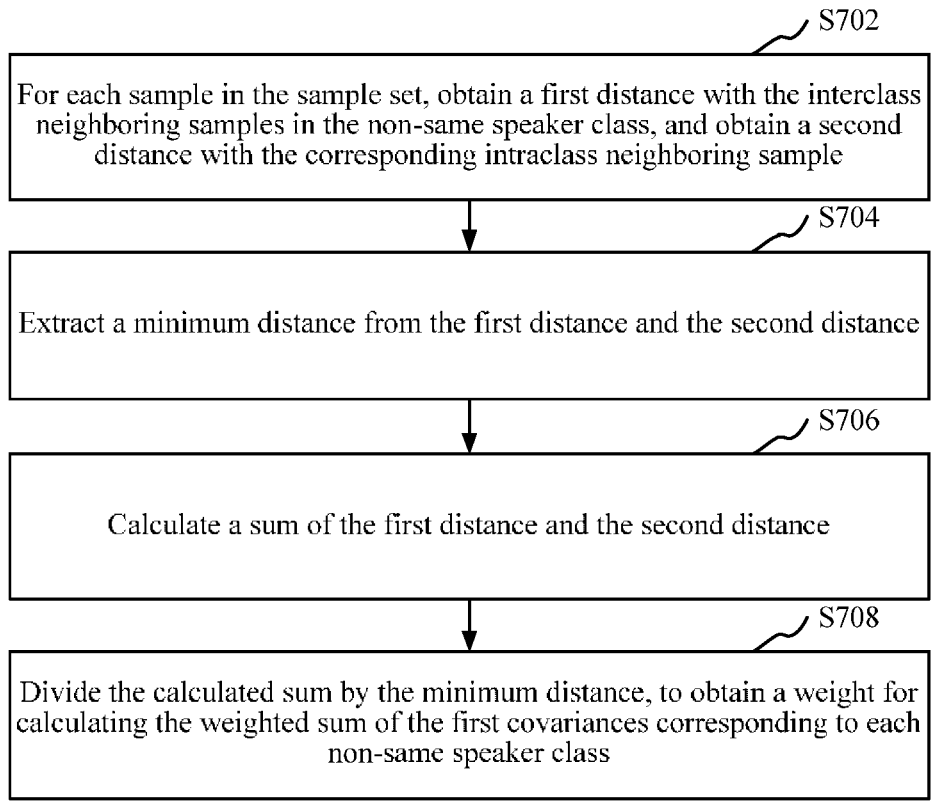
FIG. 7 is a schematic flowchart of steps of calculating a weight needed during weighted sum according to an embodiment.

FIG. 7 is a schematic flowchart of steps of calculating a weight needed during weighted sum according to an embodiment. The step is performed in any sequence before step S606. As shown in FIG. 7, the step specifically includes the following steps:

S702: For each sample in the sample set, obtain a first distance with the interclass neighboring samples in the non-same speaker class, and obtain a second distance with the corresponding intraclass neighboring sample.

Specifically, for each sample $x_l^i$ in the sample set, the first distance $d(x_l^i,NN_K(x_l^i,j))$ between $x_l^i$ and the interclass neighboring samples $NN_K(x_l^i,j)$ in the $j^{th}$ speaker class may be calculated, and the second distance $d(x_l^i,NN_K(x_l^i,i))$ between $x_l^i$ and the intraclass neighboring sample $NN_K(x_l^i,i)$ may be calculated.

S704: Extract a minimum distance from the first distance and the second distance.

Specifically, extraction of a minimum distance from the first distance and the second distance can be expressed using the following formula (4):

$$\min\{d(x_l^i,NN_K(x_l^i,i)),d(x_l^i,NN_K(x_l^i,j))\}\quad\text{(4).}$$

Herein, min represents extracting a minimum value in a set; and d represents calculating a distance. The distance may adopt a distance used for measuring similarity between samples, such as an Euclidean distance, a Manhatton distance, or a Mahalanobis distance.

S706: Calculate a sum of the first distance and the second distance.

Specifically, the sum of the first distance and the second distance may be calculated according to the following formula (5):

$$d(x_l^i,NN_K(x_l^i,i))+d(x_l^i,NN_K(x_l^i,j))\quad\text{(5).}$$

S708: Divide the calculated sum by the minimum distance, to obtain a weight for calculating the weighted sum of the first covariances corresponding to each non-same speaker class.

Specifically, a quotient of the minimum distance and the calculated sum may be calculated according to the following formula (6), to obtain a weight for calculating the weighted sum of the first covariances corresponding to each non-same speaker class:

$$\omega_l^{ij} = \frac{\min\{d(x_l^i, NN_K(x_l^i, i)), d(x_l^i, NN_K(x_l^i, j))\}}{d(x_l^i, NN_K(x_l^i, i)) + d(x_l^i, NN_K(x_l^i, j))}.\quad\text{(6)}$$

In this embodiment, the proportion of the minimum distance in the first distance and the second distance is considered during weight calculation, so as to enable the weight to accurately reflect influence of different first covariances on the interclass difference quantity. The obtained interclass difference quantity can measure the differences between the samples in the sample set more accurately, so as to facilitate precise calculation of the base vector set, thereby improving the recognition performance after performing feature transformation, on the basis of the base vector set, on the identity vector to be processed.

In an embodiment, before step S704 and step S706, the identity vector processing method further includes: separately performing synchronous scaling on the first distance and the second distance according to an adjustable parameter.

The adjustable parameter refers to a parameter for adjusting within a value range of the adjustable parameter. Synchronous scaling may be performed on the first distance and the second distance by using the adjustable parameter as a constant or a power of the first distance and the second distance.

Specifically, the weight for calculating the weighted sum of the first covariances corresponding to each non-same speaker class may be calculated according to the following formula (6):

$$\omega_l^{ij} = \frac{\min\{d^\alpha(x_l^i, NN_K(x_l^i, i)), d^\alpha(x_l^i, NN_K(x_l^i, j))\}}{d^\alpha(x_l^i, NN_K(x_l^i, i)) + d^\alpha(x_l^i, NN_K(x_l^i, j))}.$$ formula (6)

α represents the adjustable parameter, and the value range may be (0, 1). α may be 0.5.

In this embodiment, synchronous scaling may be performed on the first distance and the second distance by adjusting the adjustable parameter, so as to reduce or enlarge the difference between the weights, thereby making it convenient to perform adjustment for different environments and increasing the robustness.

Figure 8:
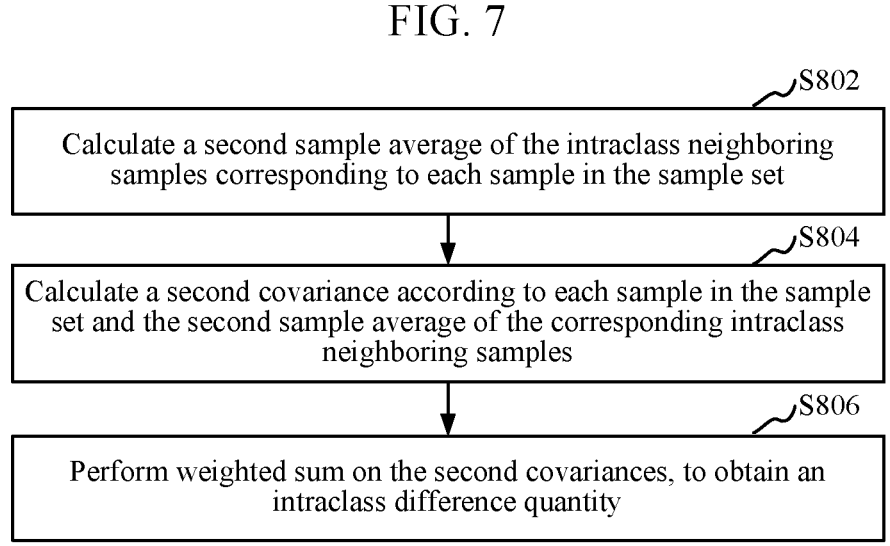
FIG. 8 is a schematic flowchart of steps of determining an intraclass difference quantity on the basis of the samples and the corresponding intraclass neighboring samples in the sample set according to an embodiment.

FIG. 8 is a schematic flowchart of step S310, that is, determining an intraclass difference quantity on the basis of the samples and the corresponding intraclass neighboring samples in the sample set according to an embodiment. As shown in FIG. 8, step S310 specifically includes the following steps:

S802: Calculate a second sample average of the intraclass neighboring samples corresponding to each sample in the sample set.

Specifically, the second sample average may be calculated according to the following formula (7):

$$M_l^{ii} = \frac{1}{K}\sum_{k=1}^{K} NN_K(x_l^i, i).$$ formula (7)

$M_l^{ii}$ represents an average of the intraclass neighboring samples $NN_k(x_l^i,i)$ corresponding to the sample $x_l^i$ in the sample set, that is, the second sample average; K represents the number of intraclass neighboring samples $NN_k(x_l^i,i)$, that is, the preset number; and k represents the serial number of a sample in the intraclass neighboring samples $NN_k(x_l^i,i)$.

S804: Calculate a second covariance according to each sample in the sample set and the second sample average of the corresponding intraclass neighboring samples.

Specifically, the second covariance may be calculated according to the following formula (8):

$(x_l^i-M_l^{ii})(x_l^i-M_l^{ii})^t$ formula (8).

Herein, t represents transposition; $x_l^i$ represents an $l^{th}$ sample in the $i^{th}$ speaker class in the sample set; and $M_l^{ii}$ represents the second sample average of the intraclass neighboring samples $NN_k(x_l^i,i)$ of the sample $x_l^i$.

S806: Perform weighted sum on the second covariances, to obtain an intraclass difference quantity.

Specifically, the intraclass difference quantity may be calculated by using the following formula (9):

$\tilde{S}_w = \Sigma_{i=1}^{C}\Sigma_{l=1}^{N_i}(x_l^i-M_l^{ii})^t$ formula (9).

$\tilde{S}_w$ is the intraclass difference, and is an intraclass variance in the formula (9); C represents a total number of speaker classes in the sample set; i is a serial number of a speaker class in the sample set; l is a serial number of a sample of an $i^{th}$ speaker class; $N_i$ represents a total number of samples of the $i^{th}$ speaker class; t represents transposition; and $M_l^{ii}$ represents a second sample average of intraclass neighboring samples $NN_k(x_l^i,i)$ of a sample $x_l^i$.

In this embodiment, the second covariance is calculated based on each sample and the corresponding second sample average in the sample set, and weighted sum is performed on the second covariances, to obtain an intraclass difference quantity. The intraclass difference quantity can measure the degree of aggregation between the samples of the same speaker classes in the sample set more accurately, so as to facilitate precise calculation of the base vector set, thereby improving the recognition performance after performing feature transformation, on the basis of the base vector set, on the identity vector to be processed.

In an embodiment, step S312 comprises: looking up for an orthogonal base vector enabling an objective function to be maximized, and forming a set of the orthogonal base vectors into the base vector set.

Specifically, the objective function may be:

$$J(v_i) = \frac{v_i^t * \tilde{S}_b * v_i}{v_i^t * \tilde{S}_w * v_i}.$$

$J(v_i)$ represents the objective function; $v_i$ is an orthogonal base vector; and t represents transposition. Optimization is performed according to the objective function $J(v_i)$, so that the objective function is maximized, to obtain a series of orthogonal base vectors $v_1, v_2 \ldots v_n$. The orthogonal base vectors are sequentially combined to form an orthogonal base vector set $A=[v_1, v_2 \ldots v_n]$. During feature transformation in step S314, the transposition of the orthogonal base vector set A may be multiplied with the identity vector to be processed to obtain the identity vector after feature transformation. Assuming that the identity vector to be processed is W, $A^tW$ is the identity vector after feature transformation.

In an embodiment, step S314 includes: separately performing feature transformation on a given identity vector and an identity vector to be verified of a target speaker class according to the base vector set. The identity vector processing method further includes: calculating a degree of similarity between the given identity vector after feature transformation and the identity vector to be verified after feature transformation; and performing speaker identity verification according to the degree of similarity.

Figure 9:
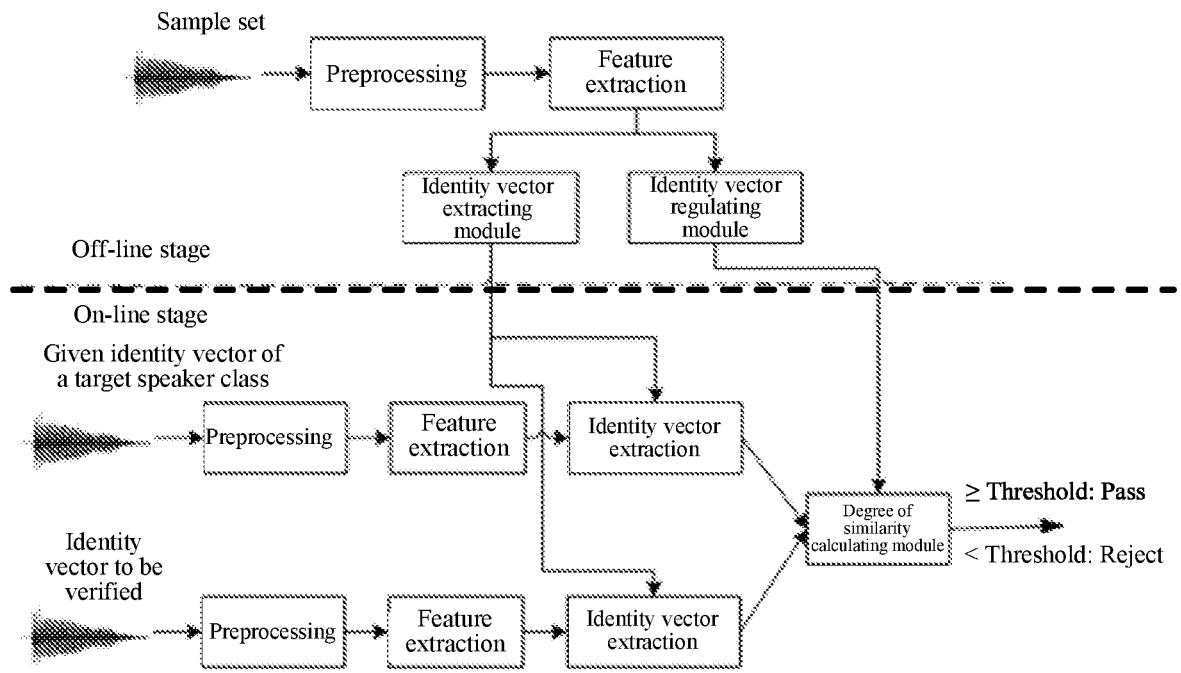
FIG. 9 is a schematic flowchart of a speaker identity recognition method according to an embodiment.

Specifically, referring to FIG. 9, speaker identity recognition may be applied to multiple scenarios where an identity of an unknown user needs to be verified. The speaker identity recognition is divided into two stages, off-line stage and on-line state. In the off-line stage, a large quantity of voices of non-target speaker classes needs to be collected to train a speaker identity recognition system. The speaker identity recognition system includes an identity vector extracting module and an identity vector regulating module.

The on-line stage is further divided into two stages: a registration stage and a recognition stage. In the registration stage, a voice is a target speaker needs to be obtained. After front-end preprocessing, feature extraction, and model training, the voices is mapped into a given identity vector of a determined length. The given identity vector is a model representing a target speaker identity. In the recognition stage, a voice to be verified of an unknown identity is obtained. after similar front-end preprocessing, feature extraction, and model training, the voice to be verified is mapped into an identity vector to be verified.

Both the given identity vector of the target speaker and the identity vector to be verified in the recognition stage subsequently pass through a back-end regulator, for performing regulation and optimization operations including feature transformation, and are finally used in the degree of similarity calculating module for calculating a degree of similarity. The degree of similarity is compared with a threshold preset manually. If the degree of similarity is greater than or equal to the threshold, it can be determined that the identity corresponding to the voice to be verified matches the target speaker identity, and the identity verification succeeds. If the degree of similarity is less than the threshold, it can be determined that the identity corresponding to the voice to be verified does not match the target speaker identity, and the identity verification fails. The degree of similarity may adopt a cosine degree of similarity, a Pearson correlation coefficient, an Euclidean distance, or the like.

In this embodiment, feature transformation is separately performed on a given identity vector and an identity vector to be verified of a target speaker class by using an obtained base vector set, so that both the given identity vector and the identity vector to be verified after feature transformation have a good distinction, thereby improving the accuracy of identity verification.

In a standard test of NIST SRE 2008 data set, an equal error rate (EER) is used as a measurement index, for performing identity recognition on an original identity vector on which no optimization is performed. The EER is 5.48%. By performing identity recognition after performing feature transformation on the original identity vector by using the identity vector processing method of this embodiment, the EER may be reduced to 5.19%, and the identity recognition performance is significantly improved. The NIST is an abbreviation of National Institute of Standards and Technology, and is translated as national institute of standards and technology; and the SRE is an abbreviation of Speaker Recognition Evaluation, and is translated as speaker recognition evaluation.

Figure 10:
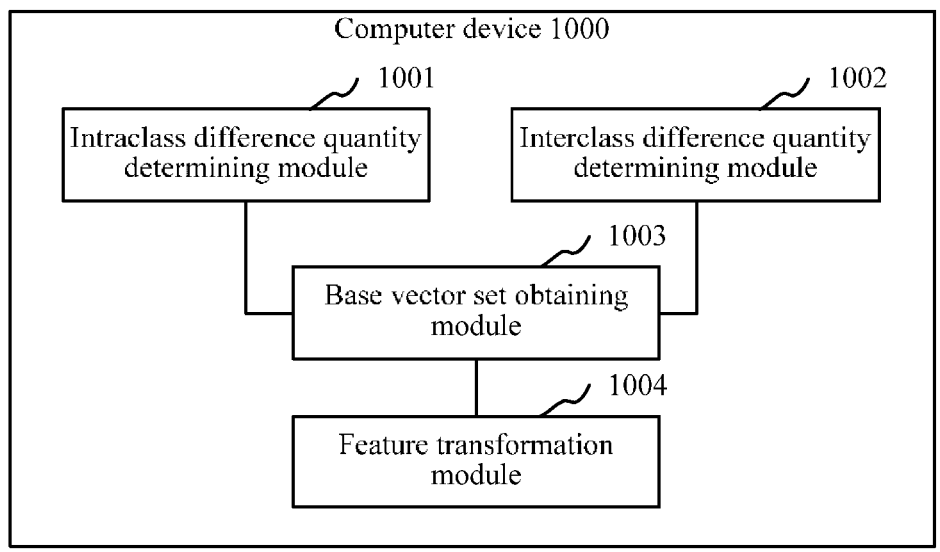
FIG. 10 is a structural block diagram of a computer device according to an embodiment.

As shown in FIG. 10, in an embodiment, provided is a computer device 1000. The computer device 1000 may be used as a server or a terminal. The internal structure of the server may correspond to the structure shown in FIG. 2A, and the internal structure of the terminal may correspond to the structure shown in FIG. 2B. Each module below may be entirely or partially implemented through software, hardware, or a combination of software and hardware.

In an embodiment, the computer device 1000 includes an interclass difference quantity determining module 1001, an intraclass difference quantity determining module 1002, a base vector set obtaining module 1003, and a feature transformation module 1004.

The interclass difference quantity determining module 1001 is configured to obtain a sample set, the sample set including samples of identity vectors of multiple speaker classes, obtain a corresponding interclass neighboring sample for each sample in the sample set, and determine an interclass difference quantity on the basis of the samples and the corresponding interclass neighboring samples in the sample set.

The intraclass difference quantity determining module 1002 is configured to obtain an intraclass neighboring sample corresponding to each sample in the sample set, and determine an intraclass difference quantity on the basis of the samples and the corresponding intraclass neighboring samples in the sample set.

The base vector set obtaining module 1003 is configured to a base vector set, the interclass difference quantity projected on base vectors in the base vector set being maximized in value, and the intraclass difference quantity projected on the base vectors in the base vector set being minimized in value.

The feature transformation module 1004 is configured to perform feature transformation, on the basis of the base vector set, on the identity vector to be processed.

By the computer device 1000, the interclass neighboring samples may reflect a partial distribution of neighboring samples of different speaker classes in the sample set, and the intraclass neighboring samples may reflect a partial distribution of neighboring samples of the same speaker class in the sample set, so that the interclass and intraclass differences in the sample set can be reflected more accurately. The interclass difference quantity determined according to the samples and the corresponding interclass neighboring samples in the sample set can accurately reflect the difference between different speaker classes in the sample set, and the intraclass difference quantity determined according to the samples and the corresponding intraclass neighboring samples in the sample set can accurately reflect the difference between the same speaker class in the sample set. After performing feature transformation, on the basis of the base vector set, on the identity vector to be processed, the identity vector after the feature transformation has a good interclass distinction and intraclass aggregation, the situation in which identity vector recognition performance is lowered caused by interference can be reduced, and the accuracy of speaker identity recognition can be improved.

In an embodiment, the interclass difference quantity determining module 1001 is further configured to: traverse the samples in the sample set; determine samples in a non-same speaker class with the traversed samples; calculate distances between the traversed samples and the samples in the non-same speaker class; and rank samples of each speaker class among the samples in the non-same speaker class according to an ascending order of the corresponding distances, and select, sequentially from the first sample, a preset number of samples as the interclass neighboring samples in the non-same speaker class corresponding to the traversed samples.

In this embodiment, the interclass neighboring sample corresponding to each sample in the sample set can be precisely determined, so as to facilitate precise calculation of the base vector set, thereby improving the recognition performance after performing feature transformation, based on the base vector set, on the identity vector to be processed.

In an embodiment, the intraclass difference quantity determining module 1002 is further configured to: traverse the samples in the sample set; determine samples in a same speaker class with the traversed samples; calculating distances between the traversed samples and the samples in the same speaker class; and rank the samples in the same speaker class according to an ascending order of the corresponding distances, and select, sequentially from the first sample, a preset number of samples as the intraclass neighboring samples corresponding to the traversed samples.

In this embodiment, the intraclass neighboring sample corresponding to each sample in the sample set can be precisely determined, so as to facilitate precise calculation of the base vector set, thereby improving the recognition performance after performing feature transformation, based on the base vector set, on the identity vector to be processed.

In an embodiment, the interclass difference quantity determining module 1001 is further configured to: calculate a first sample average of the interclass neighboring samples in each non-same speaker class corresponding to each sample in the sample set; calculate a first covariance according to each sample in the sample set and the first sample average of the corresponding interclass neighboring samples in each non-same speaker class; and perform weighted sum on the first covariances, to obtain an interclass difference quantity.

In this embodiment, the first covariance is calculated based on each sample and the corresponding first sample average in the sample set, and weighted sum is performed on the first covariances, to obtain an interclass difference quantity. The interclass difference quantity can measure the differences between the samples of different speaker classes in the sample set more accurately, so as to facilitate precise calculation of the base vector set, thereby improving the recognition performance after performing feature transformation, on the basis of the base vector set, on the identity vector to be processed.

Figure 11:
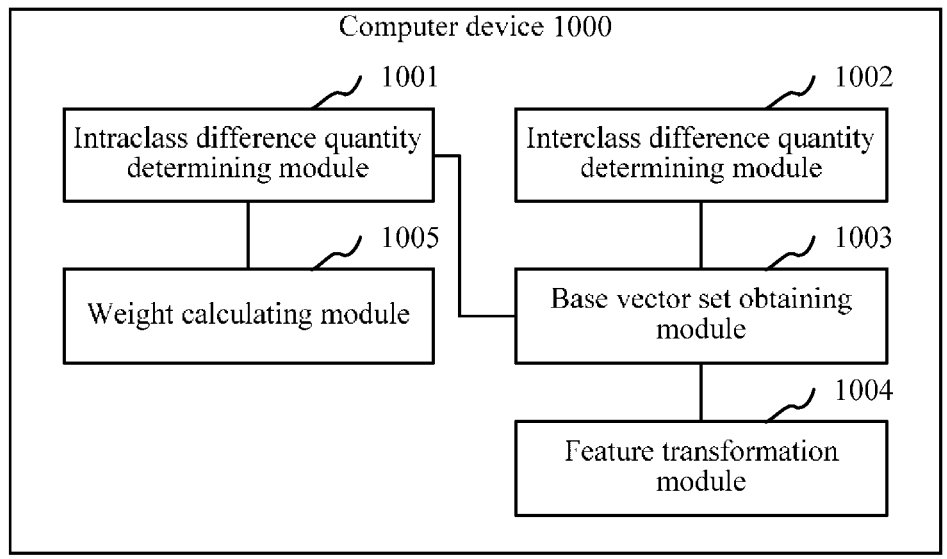
FIG. 11 is a structural block diagram of a computer device according to another embodiment.

As shown in FIG. 11, in an embodiment, the computer device 1000 further includes: a weight calculating module 1005, configured to: for each sample in the sample set, obtain a first distance with the interclass neighboring samples in the non-same speaker class, and obtain a second distance with the corresponding intraclass neighboring sample; extract a minimum distance from the first distance and the second distance; calculate a sum of the first distance and the second distance; and divide the calculated sum by the minimum distance, to obtain a weight for calculating the weighted sum of the first covariances corresponding to each non-same speaker class.

In this embodiment, the proportion of the minimum distance in the first distance and the second distance is considered during weight calculation, so as to enable the weight to accurately reflect influence of different first covariances on the interclass difference quantity. The obtained interclass difference quantity can measure the differences between the samples in the sample set more accurately, so as to facilitate precise calculation of the base vector set, thereby improving the recognition performance after performing feature transformation, on the basis of the base vector set, on the identity vector to be processed.

In an embodiment, the weight calculating module 1005 may be further configured to separately perform synchronous scaling on the first distance and the second distance according to an adjustable parameter In this embodiment, synchronous scaling may be performed on the first distance and the second distance by adjusting the adjustable parameter, so as to reduce or enlarge the difference between the weights, thereby making it convenient to perform adjustment for different environments and increasing the robustness.

In an embodiment, the intraclass difference quantity determining module 1002 is further configured to: calculate a second sample average of the intraclass neighboring samples corresponding to each sample in the sample set; calculate a second covariance according to each sample in the sample set and the second sample average of the corresponding intraclass neighboring samples; and perform weighted sum on the second covariances, to obtain an intraclass difference quantity.

In this embodiment, the second covariance is calculated based on each sample and the corresponding second sample average in the sample set, and weighted sum is performed on the second covariances, to obtain an intraclass difference quantity. The intraclass difference quantity can measure the degree of aggregation between the samples of the same speaker classes in the sample set more accurately, so as to facilitate precise calculation of the base vector set, thereby improving the recognition performance after performing feature transformation, on the basis of the base vector set, on the identity vector to be processed.

Figure 12:
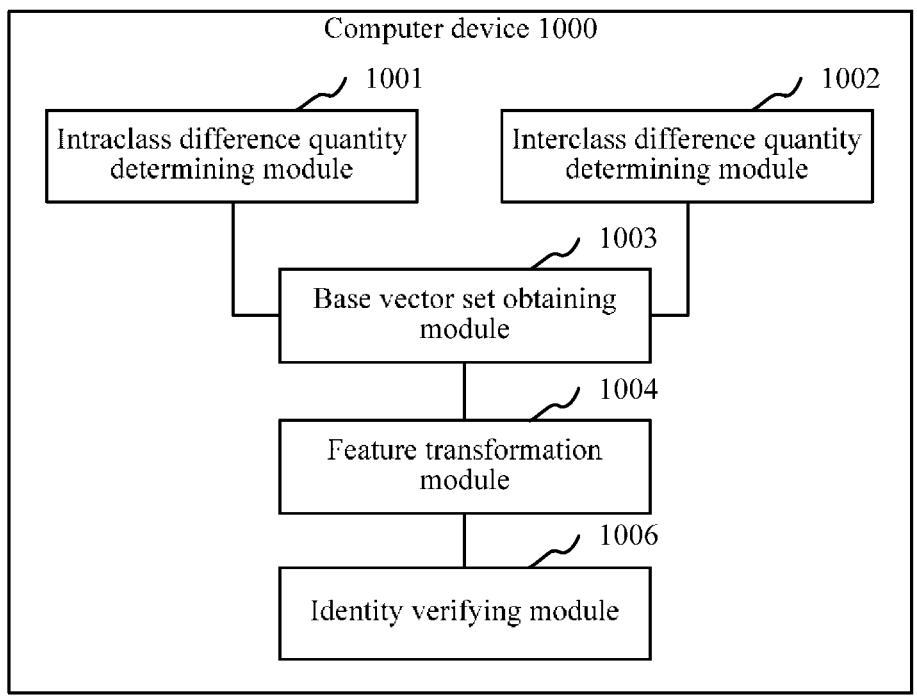
FIG. 12 is a structural block diagram of a computer device according to still another embodiment.

In an embodiment, the feature transformation module 1004 is further configured to: separately perform feature transformation on a given identity vector and an identity vector to be verified of a target speaker class according to the base vector set. As shown in FIG. 12, in an embodiment, the computer device 1000 further includes an identity verifying module 1006, configured to: calculate a degree of similarity between the given identity vector after feature transformation and the identity vector to be verified after feature transformation; and perform speaker identity verification according to the degree of similarity.

In this embodiment, feature transformation is separately performed on a given identity vector and an identity vector to be verified of a target speaker class by using an obtained base vector set, so that both the given identity vector and the identity vector to be verified after feature transformation have a good distinction, thereby improving the accuracy of identity verification.

An embodiment provides a computer device, including: a storage and a processor, the storage storing computer readable instructions, and the computer readable instructions, when executed by the processor, causing the processor to perform the following steps: obtaining a sample set, the sample set including samples of identity vectors of multiple speaker classes; obtaining a corresponding interclass neighboring sample for each sample in the sample set; obtaining a corresponding intraclass neighboring sample for each sample in the sample set; determining an interclass difference quantity on the basis of the samples and the corresponding interclass neighboring samples in the sample set; determining an intraclass difference quantity on the basis of the samples and the corresponding intraclass neighboring samples in the sample set; obtaining a base vector set, the interclass difference quantity projected on base vectors in the base vector set being maximized in value, and the intraclass difference quantity projected on the base vectors in the base vector set being minimized in value; and performing feature transformation, on the basis of the base vector set, on identity vectors to be processed.

In an embodiment, the obtaining a corresponding interclass neighboring sample for each sample in the sample set includes: traversing the samples in the sample set; determining samples in a non-same speaker class with the traversed samples; calculating distances between the traversed samples and the samples in the non-same speaker class; and ranking samples of each speaker class among the samples in the non-same speaker class according to an ascending order of the corresponding distances, and selecting, sequentially from the first sample, a preset number of samples as the interclass neighboring samples in the non-same speaker class corresponding to the traversed samples.

In an embodiment, the obtaining a corresponding intraclass neighboring sample for each sample in the sample set includes: traversing the samples in the sample set; calculating distances between the traversed samples and the samples in the same speaker class; and ranking the samples in the same speaker class according to an ascending order of the corresponding distances, and selecting, sequentially from the first sample, a preset number of samples as the intraclass neighboring samples corresponding to the traversed samples.

In an embodiment, the determining an interclass difference quantity on the basis of the samples and the corresponding interclass neighboring samples in the sample set includes: calculating a first sample average of the interclass neighboring samples in each non-same speaker class corresponding to each sample in the sample set; calculating a first covariance according to each sample in the sample set and the first sample average of the corresponding interclass neighboring samples in each non-same speaker class; and performing weighted sum on the first covariances, to obtain an interclass difference quantity.

In an embodiment, the computer readable instructions further cause the processor to perform the following steps: for each sample in the sample set, obtaining a first distance with the interclass neighboring samples in the non-same speaker class, and obtaining a second distance with the corresponding intraclass neighboring sample; extracting a minimum distance from the first distance and the second distance; calculating a sum of the first distance and the second distance; and dividing the calculated sum by the minimum distance, to obtain a weight for calculating the weighted sum of the first covariances corresponding to each non-same speaker class.

In an embodiment, before the extracting a minimum distance from the first distance and the second distance and calculating a sum of the first distance and the second distance, the computer readable instructions further cause the processor to perform the following step: separately performing synchronous scaling on the first distance and the second distance according to an adjustable parameter.

In an embodiment, the determining an intraclass difference quantity on the basis of the samples and the corresponding intraclass neighboring samples in the sample set includes: calculating a second covariance according to each sample in the sample set and the second sample average of the corresponding intraclass neighboring samples; and performing weighted sum on the second covariances, to obtain an intraclass difference quantity.

In an embodiment, the performing feature transformation, on the basis of the base vector set, on identity vectors to be processed includes: separately performing feature transformation on a given identity vector and an identity vector to be verified of a target speaker class according to the base vector set. The computer readable instructions further cause the processor to perform the following steps: calculating a degree of similarity between the given identity vector after feature transformation and the identity vector to be verified after feature transformation; and performing speaker identity verification according to the degree of similarity.

In an embodiment, the determining an interclass difference quantity on the basis of the samples and the corresponding interclass neighboring samples in the sample set includes: calculating the interclass difference quantity using the following formula:

$$\tilde{S}_b = \sum_{i=1}^{C} \sum_{\substack{j=1 \\ j \neq i}}^{C} \sum_{l=1}^{N_i} \omega_l^{ij} (x_l^i - M_l^{ij})(x_l^i - M_l^{ij})^t.$$

$\tilde{S}_b$ is the interclass difference quantity; C represents a total number of speaker classes in the sample set; i and j are serial numbers of different speaker classes in the sample set; l is a serial number of a sample of an $i^{th}$ speaker class; $N_i$ represents a total number of samples of the $i^{th}$ speaker class; t represents transposition; $M_l^{ij}$ represents a first sample average of interclass neighboring samples $NN_K(x_l^i, j)$ of a $j^{th}$ speaker class corresponding to a sample $x_l^i$; and $\omega_l^{ij}$ represents a weight for weighted sum of first covariances of the $j^{th}$ speaker class corresponding to the sample $x_l^i$.

In an embodiment, the determining an intraclass difference quantity on the basis of the samples and the corresponding intraclass neighboring samples in the sample set includes: calculating the intraclass difference quantity using the following formula:

$\tilde{S}_w = \sum_{i=1}^{C} \sum_{l=1}^{N_i} (x_l^i - M_l^{ii})(x_l^i - M_l^{ii})^t.$ $\tilde{S}_w$ is the intraclass difference; C represents a total number of speaker classes in the sample set; i is a serial number of a speaker class in the sample set; l is a serial number of a sample of an $i^{th}$ speaker class; $N_i$ represents a total number of samples of the $i^{th}$ speaker class; t represents transposition; and $M_l^{ii}$ represents a second sample average of intraclass neighboring samples $NN_K(x_l^i, i)$ of a sample $x_l^i$.

In an embodiment, the obtaining a base vector set includes: looking up for an orthogonal base vector enabling an objective function $J(v_i)$ to be maximized, and forming a set of the orthogonal base vectors into the base vector set, where in $$J(v_i) = \frac{v_i^t * \tilde{S}_b * v_i}{v_i^t * \tilde{S}_w * v_i},$$

$v_i$ is an $i^{th}$ orthogonal base vector; t represents transposition; $\tilde{S}_b$ is the interclass difference quantity; and $\tilde{S}_w$ is the intraclass difference quantity.

By the computer device, the interclass neighboring samples may reflect a partial distribution of neighboring samples of different speaker classes in the sample set, and the intraclass neighboring samples may reflect a partial distribution of neighboring samples of the same speaker class in the sample set, so that the interclass and intraclass differences in the sample set can be reflected more accurately. The interclass difference quantity determined according to the samples and the corresponding interclass neighboring samples in the sample set can accurately reflect the difference between different speaker classes in the sample set, and the intraclass difference quantity determined according to the samples and the corresponding intraclass neighboring samples in the sample set can accurately reflect the difference between the same speaker class in the sample set. After performing feature transformation, on the basis of the base vector set, on the identity vector to be processed, the identity vector after the feature transformation has a good interclass distinction and intraclass aggregation, the situation in which identity vector recognition performance is lowered caused by interference can be reduced, and the accuracy of speaker identity recognition can be improved.

A person of ordinary skill in the art may understand that all or some of the procedures of the methods of the foregoing embodiments may be implemented by a computer program instructing relevant hardware. The program may be stored in a non-volatile computer readable storage medium. When the program is executed, the program may include the procedures of the embodiments of the foregoing methods. The storage medium may be a magnetic disk, an optical disc, a read-only memory (ROM), or the like.

Various technical features in the foregoing embodiments may be combined randomly. For ease of description, possible combinations of various technical features in the foregoing embodiments are not all described. However, the combinations of the technical features is considered as falling within the scope recorded in this specification provided that the combinations of the technical features are compatible with each other.

The foregoing embodiments describe several implementations of this application, which are described specifically and in detail, and therefore cannot be construed as a limitation to the patent scope of the present disclosure. It is noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A method for identity processing, comprising:
obtaining, by processing circuitry of an information processing apparatus, a set of identity vectors that are calculated according to voice samples from speakers, the identity vectors being classified into speaker classes respectively corresponding to the speakers;
selecting, from the identity vectors, first subsets of interclass neighboring identity vectors respectively corresponding to the identity vectors, a first subset of the first subsets of interclass neighboring identity vectors corresponding to an identity vector of the identity vectors being in different speaker classes from the corresponding identity vector;
selecting, from the identity vectors, second subsets of intraclass neighboring identity vectors respectively corresponding to the identity vectors, a second subset of the second subsets of intraclass neighboring identity vectors corresponding to an identity vector of the identity vectors being in a same speaker class as the corresponding identity vector;
determining an interclass difference based on the first subsets of interclass neighboring identity vectors and the corresponding identity vectors;
determining an intraclass difference based on the second subsets of intraclass neighboring identity vectors and the corresponding identity vectors;
determining a set of basis vectors to maximize a projection of the interclass difference on the basis vectors and to minimize a projection of the intraclass difference on the basis vectors;
converting an input identity vector of a target speaker according to the basis vectors; and
performing a verification of the target speaker based on the converted input identity vector.

2. The method according to claim 1, wherein the selecting, from the identity vectors, the first subsets of interclass neighboring identity vectors respectively corresponding to the identity vectors comprises:
calculating, for a specific identity vector of the identity vectors, distances between the specific identity vector and other identity vectors that are in different speaker classes from the specific identity vector;
ranking the other identity vectors according to an ascending order of the distances; and
selecting, according to the ranking of the other identity vectors, a preset number of the other identity vectors as the first subset of interclass neighboring identity vectors corresponding to the specific identity vector.

3. The method according to claim 1, wherein the selecting, from the identity vectors, the second subsets of intraclass neighboring identity vectors respectively corresponding to the identity vectors comprises:
calculating, for a specific identity vector of the identity vectors, distances between the specific identity vector and other identity vectors that are in the same speaker class as the specific identity vector;
ranking the other identity vectors according to an ascending order of the distances; and
selecting, according to the ranking of the other identity vectors, a preset number of the other identity vectors as the second subset of intraclass neighboring identity vectors corresponding to the specific identity vector.

4. The method according to claim 1, wherein the determining the interclass difference based on the first subsets of interclass neighboring identity vectors and the corresponding identity vectors comprises:
calculating, based on a specific first subset of the first subsets of interclass neighboring identity vectors corresponding to a specific identity vector of the identity vectors of a first speaker class, averages respectively for speaker classes other than the first speaker class; and
weighting covariances of the specific identity vector and the averages in a calculation to obtain the interclass difference.

5. The method according to claim 4, wherein the weighting the covariances of the specific identity vector to the averages in the calculation to obtain the interclass difference further comprises:
selecting, from the specific first subset of interclass neighboring identity vectors corresponding to the specific identity vector of the first speaker class, a group of interclass neighboring identity vectors of a second speaker class;
determining, a first distance of the specific identity vector to the group of interclass neighboring identity vectors;
determining, a second distance of the specific identity vector to the second subset of intraclass neighboring identity vectors corresponding to the specific identity vector;
extracting a minimum distance of the first distance and the second distance;
calculating a sum of the first distance and the second distance; and
dividing the minimum distance by the sum, to obtain a weight for weighting specific covariances of the specific identity vector and the interclass neighboring identity vectors of the second speaker class.

6. The method according to claim 5, wherein before the extracting the minimum distance from the first distance and the second distance, the method further comprises:
separately performing synchronous scaling on the first distance and the second distance according to an adjustable parameter.

7. The method according to claim 1, wherein the determining the intraclass difference based on the second subsets of intraclass neighboring identity vectors and the corresponding identity vectors comprises:
calculating averages respectively based on the second subsets of intraclass neighboring identity vectors corresponding to the identity vectors;
calculating covariances respectively of the identity vectors and the corresponding averages; and
weighting the covariances in a calculation to obtain the intraclass difference.

8. The method according to claim 1, further comprising:
converting the identity vectors corresponding to the target speaker according to the basis vectors; and
calculating a degree of similarity between the converted identity vectors and the converted input identity vector, wherein
the input identity vector is of a voice sample for the verification to verify the voice sample being generated by the target speaker, and
the performing the verification of the target speaker includes verifying whether the voice sample belongs to the target speaker according to the degree of similarity.

9. The method according to claim 1, wherein the determining the interclass difference based on the first subsets of interclass neighboring identity vectors and the corresponding identity vectors and the determining the intraclass difference based on the second subsets of intraclass neighboring identity vectors and the corresponding identity vectors comprise:

calculating the interclass difference using the following formula:

$$\tilde{S}_b = \sum_{i=1}^{C} \sum_{\substack{j=1 \\ j \neq i}}^{C} \sum_{l=1}^{N_i} \omega_l^{ij}(x_l^i - M_l^{ij})(x_l^i - M_l^{ij})^t,$$

wherein $\tilde{S}_b$ is the interclass difference; C represents a total number of the speaker classes in the set; i and j are serial numbers of different speaker classes in the set; l is a serial number of an identity vector of an $i^{th}$ speaker class; $N_i$ represents a total number of identity vectors of the $i^{th}$ speaker class; t represents transposition; $M_l^{ij}$ represents a first sample average of interclass neighboring identity vectors $NN_K(x_l^i, j)$ of a $j^{th}$ speaker class corresponding to an identity vector $x_l^i$; and $\omega_l^{ij}$ represents a weight for weighted sum of first covariances of the $j^{th}$ speaker class corresponding to the identity vector $x_l^i$; and calculating the intraclass difference using the following formula:

$\tilde{S}_w = \sum_{i=1}^{C} \sum_{l=1}^{N_i}(x_l^i - M_l^{ii})(x_l^i - M_l^{ii})^t$, wherein $\tilde{S}_w$ is the intraclass difference; C represents the total number of speaker classes in the set; i is a serial number of a speaker class in the set; l is a serial number of an identity vector of an $i^{th}$ speaker class; $N_i$ represents a total number of identity vectors of the $i^{th}$ speaker class; t represents transposition; and $M_l^{ii}$ represents a second sample average of intraclass neighboring identity vector $NN_k(x_l^i, i)$ of an identity vector $x_l^i$.

10. The method according to claim 9, wherein the determining the set of basis vectors to maximize the projection of the interclass difference on the basis vectors and to minimize the projection of the intraclass difference on the basis vectors comprises:

looking up for orthogonal basis vectors that enable an objective function $J(v_i)$ to be maximized, wherein in $$J(v_i) = \frac{v_i^t * \tilde{S}_b * v_i}{v_i^t * \tilde{S}_w * v_i},$$

$v_i$ is an $i^{th}$ orthogonal basis vector; t represents transposition; $\tilde{S}_b$ is the interclass difference; and $\tilde{S}_w$ is the intraclass difference.

11. A computer device, comprising:
processing circuitry configured to:
obtain, a set of identity vectors that are calculated according to voice samples from speakers, the identity vectors being classified into speaker classes respectively corresponding to the speakers;
select, from the identity vectors, first subsets of interclass neighboring identity vectors respectively corresponding to the identity vectors, a first subset of the first subsets of interclass neighboring identity vectors corresponding to an identity vector of the identity vectors being in different speaker classes from the corresponding identity vector;
select, from the identity vectors, second subsets of intraclass neighboring identity vectors respectively corresponding to the identity vectors, a second subset of the second subsets of intraclass neighboring identity vectors corresponding to an identity vector of the identity vectors being in a same speaker class as the corresponding identity vector;
determine an interclass difference based on the first subsets of interclass neighboring identity vectors and the corresponding identity vectors;
determine an intraclass difference based on the second subsets of intraclass neighboring identity vectors and the corresponding identity vectors;
determine a set of basis vectors to maximize a projection of the interclass difference on the basis vectors and to minimize a projection of the intraclass difference on the basis vectors;
convert an input identity vector of a target speaker according to the basis vectors; and
perform a verification of the target speaker based on the converted input identity vector.

12. The computer device according to claim 11, wherein the processing circuitry is configured to:
calculate, for a specific identity vector of the identity vectors, distances between the specific identity vector and other identity vectors that are in different speaker classes from the specific identity vector;
rank the other identity vectors according to an ascending order of the distances; and
select, according to the ranking of the other identity vectors, a preset number of the other identity vectors as the first subset of interclass neighboring identity vectors corresponding to the specific identity vector.

13. The computer device according to claim 11, wherein the processing circuitry is configured to:
calculate, for a specific identity vector of the identity vectors, distances between the specific identity vector and other identity vectors that are in a same speaker class as the specific identity vector;
rank the other identity vectors according to an ascending order of the distances; and
select, according to the ranking of the other identity vectors, a preset number of the other identity vectors as the second subset of interclass neighboring identity vectors corresponding to the specific identity vector.

14. The computer device according to claim 11, wherein the processing circuitry is configured to:
calculate, based on a specific first subset of the first subsets of interclass neighboring identity vectors corresponding to a specific identity vector of the identity vectors of a first speaker class, averages respectively for speaker classes other than the first speaker class; and
weight covariances of the specific identity vector and the averages in a calculation to obtain the interclass difference.

15. The computer device according to claim 14, wherein the processing circuitry is configured to:
select, from the specific first subset of interclass neighboring identity vectors corresponding to the specific identity vector of the first speaker class, a group of interclass neighboring identity vectors of a second speaker class;
determine, a first distance of the specific identity vector to the group of interclass neighboring identity vectors;

determine, a second distance of the specific identity vector to the second subset of intraclass neighboring identity vectors corresponding to the specific identity vector;

extract a minimum distance from the first distance and the second distance;

calculate a sum of the first distance and the second distance; and divide the minimum distance by the sum, to obtain a weight for weighting specific covariances of the specific identity vector and the interclass neighboring identity vectors of the second speaker class.

16. The computer device according to claim 15, wherein before the extraction of the minimum distance from the first distance and the second distance, the processing circuitry is configured to:

separately perform synchronous scaling on the first distance and the second distance according to an adjustable parameter.

17. The computer device according to claim 11, wherein the processing circuitry is configured to:

calculate averages respectively based on the second subsets of intraclass neighboring identity vectors corresponding to the identity vectors;

calculate covariances respectively of the identity vectors and the corresponding averages; and weight the covariances in a calculation to obtain the intraclass difference.

18. The computer device according to claim 11, wherein the processing circuitry is configured to:

convert the identity vectors corresponding to the target speaker according to the basis vectors; and calculate a degree of similarity between the converted identity vectors and the converted input identity vector, and the input identity vector is of a voice sample for the verification to verify the voice sample being generated by the target speaker, and the processing circuitry is configured to verify whether the voice sample belongs to the target speaker according to the degree of similarity.

19. The computer device according to claim 11, wherein the processing circuitry is configured to:

calculate the interclass difference using:

$$\tilde{S}_b = \sum_{i=1}^{C} \sum_{\substack{j=1 \\ j \neq i}}^{C} \sum_{l=1}^{N_i} \omega_l^{ij}(x_l^i - M_l^{ij})(x_l^i - M_l^{ij})^t,$$

wherein $\tilde{S}_b$ is the interclass difference; C represents a total number of the speaker classes in the set; i and j are serial numbers of different speaker classes in the set; l is a serial number of an identity vector of an $i^{th}$ speaker class; $N_i$ represents a total number of identity vectors of the $i^{th}$ speaker class; t represents transposition; $M_l^{ij}$ represents a first sample average of interclass neighboring identity vectors $NN_K(x_l^i,j)$ of a $j^{th}$ speaker class corresponding to an identity vector $x_l^i$; and $\omega_l^{ij}$ represents a weight for weighted sum of first covariances of the $j^{th}$ speaker class corresponding to the identity vector $x_l^i$; and calculate the intraclass difference using:

$\tilde{S}_w = \sum_{i=1}^{C} \sum_{l=1}^{N_i}(x_l^i - M_l^{ii})(x_l^i - M_l^{ii})^t$, wherein $\tilde{S}_w$ is the intraclass difference; C represents the total number of speaker classes in the set; i is a serial number of a speaker class in the set; l is a serial number of an identity vector of an $i^{th}$ speaker class; $N_i$ represents a total number of identity vectors of the $i^{th}$ speaker class; t represents transposition; and $M_l^{ii}$ represents a second sample average of intraclass neighboring identity vector $NN_K(x_l^i,i)$ of an identity vector $x_l^i$.

20. A non-transitory computer-readable medium storing instructions which when executed by a computer cause the computer to perform:

obtaining a set of identity vectors that are calculated according to voice samples from speakers, the identity vectors being classified into speaker classes respectively corresponding to the speakers;

selecting, from the identity vectors, first subsets of interclass neighboring identity vectors respectively corresponding to the identity vectors, a first subset of the first subsets of interclass neighboring identity vectors corresponding to an identity vector of the identity vectors being in different speaker classes from the corresponding identity vector;

selecting, from the identity vectors, second subsets of intraclass neighboring identity vectors respectively corresponding to the identity vectors, a second subset of the second subsets of intraclass neighboring identity vector corresponding to an identity vector of the identity vectors being in a same speaker class as the corresponding identity vector;

determining an interclass difference based on the first subsets of interclass neighboring identity vectors and the corresponding identity vectors;

determining an intraclass difference based on the second subsets of intraclass neighboring identity vectors and the corresponding identity vectors;

determining a set of basis vectors to maximize a projection of the interclass difference on the basis vectors and to minimize a projection of the intraclass difference on the basis vectors;

converting an input identity vector of a target speaker according to the basis vectors; and performing a verification of the target speaker based on the converted input identity vector.

* * * * *